United States Patent
Lewis (10) Patent No.: US 10,442,333 B1
(45) Date of Patent: Oct. 15, 2019

(54) ARMREST FOR REMOVABLE DOOR VEHICLES

(71) Applicant: Lewis Innovations LLC, Muscatine, IA (US)

(72) Inventor: Craig Lewis, Muscatine, IA (US)

(73) Assignee: Lewis Innovations LLC, Muscatine, IA (US)

( * ) Notice: Subject to any disclaimer, the term of this patent is extended or adjusted under 35 U.S.C. 154(b) by 0 days.

(21) Appl. No.: 15/701,121

(22) Filed: Sep. 11, 2017

Related U.S. Application Data (60) Provisional application No. 62/393,051, filed on Sep. 11, 2016.

(51) Int. Cl.
*B60N 2/75* (2018.01)

(52) U.S. Cl.
CPC ............... *B60N 2/78* (2018.02); *B60N 2/753* (2018.02); *B60N 2/787* (2018.02)

(58) Field of Classification Search
CPC ............ B60N 2/78; B60N 2/787; B60N 2/753
USPC ........................................ 296/153, 1.09, 1.02
See application file for complete search history.

(56) References Cited

U.S. PATENT DOCUMENTS

| | | | |
|---|---|---|---|
| 6,340,189 B1 * | 1/2002 | Pordy .................... | B60N 3/023 16/110.1 |
| 6,799,353 B1 * | 10/2004 | Stewart .................. | B60N 3/023 16/110.1 |
| 9,403,466 B1 * | 8/2016 | Deng ..................... | B60N 3/023 |

* cited by examiner

*Primary Examiner* — Joseph D. Pape
(74) *Attorney, Agent, or Firm* — Hamilton IP Law, PC; Jay R. Hamilton; Charles A. Damschen (57) ABSTRACT

An armrest for removable door vehicles is disclosed which allows for the user of a vehicle having removable doors to use the door frame and existing striker plate to work with the removed door(s) for insertion of the mount disclosed into the door striker plate so that the mount may support an armrest attached to the upper leg of the mount via a housing.

18 Claims, 11 Drawing Sheets

ARMREST FOR REMOVABLE DOOR VEHICLES

CROSS REFERENCE TO RELATED APPLICATIONS

The present application claims priority from utility provisional U.S. Pat. App. No. 62/393,051 filed on Sep. 11, 2016, which is incorporated by reference herein in its entirety.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

SUMMARY OF DISCLOSURE

As disclosed, the Armrest for Removable Door Vehicles provides a safe, secure and strong solution to the problem caused by the removal of the doors from a vehicle, particularly off-road vehicles such as Jeeps and Humvees. As discussed therein, the Armrest for Removable Door Vehicles provides a mounting system that works with the door striker plate and The concept of the Armrest for Removable Door Vehicles may be deployed in any situation or on any vehicle fitted with doors that can be removed and the vehicle still operated for enjoyment. Although shown herein as used for a Jeep vehicle, the concept of the disclosure is not so limited and could be applied to any vehicle therein without limitation or restriction.

BRIEF DESCRIPTION OF THE DRAWINGS

The accompanying drawings, which are incorporated in and constitute a part of this specification, illustrate embodiments and together with the description, serve to explain and illustrate the principles of the Armrest for Removable Door Vehicles as disclosed herein.

| DETAILED DESCRIPTION - TABLE OF ELEMENTS | |
|---|---|
| Element Description | Element Number |
| Vehicle | 1 |
| Door frame | 2 |
| Door striker plate | 3 |
| Door striker plate crossbar | 3a |
| Seat | 5 |
| Seat Belt | 6 |
| Seat Belt Receiver | 7 |
| Armrest for Removable Door Vehicles | 10 |
| Mount | 11 |
| Lower leg | 11a |
| Recess | 11b |
| Upper leg | 11c |
| Angled portion | 11d |
| Aperture (pin/housing) | 11e |
| Aperture (locking pin) | 11f |
| Ledge | 11h |
| Notch | 11i |
| Enclosed notch | 11j |
| Housing | 12 |
| Slot | 13 |
| Pad (armrest) | 14 |
| Pin | 15 |
| Locking Pin | 16 |

DETAILED DESCRIPTION

Before the present Armrest for Removable Door Vehicles 10 is disclosed and described, it is to be understood that the Armrest for Removable Door Vehicles 10 is not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used with at least one embodiment of the disclosed Armrest for Removable Door Vehicles 10. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all potential embodiments of the Armrest for Removable Door Vehicles 10. This applies to all aspects of this application including, but not limited to, components of an Armrest for Removable Door Vehicles 10. Thus, if there are a variety of additional components that can be added it is understood that each of these additional components can be added with any specific embodiment or combination of embodiments of the Armrest for Removable Door Vehicles 10. The present Armrest for Removable Door Vehicles 10 may be understood more readily by reference to the following detailed description of preferred embodiments and the examples included therein and to the Figures and their previous and following description.

It is contemplated that in the illustrative embodiment shown in the enclosed figures the Armrest for Removable Door Vehicles 10 may be constructed of, but not limited to, any metal or combination of metals including bronze, steel and aluminum; plastics or carbon fiber including Kevlar®, foam-blown polyurethane, thermoplastic polyurethane, ethylene vinyl acetate, other polymers, other thermoplastics, carbon rubber, blown rubber polymers, composite materials, natural materials (e.g., rubber, leather, etc.), elastomers, combinations thereof, and/or any other material with suitable characteristics (e.g., compressive strength, stability, elasticity, density). This particular embodiment of an Armrest for Removable Door Vehicles 10 has a mount 11 fabricated from aluminum using various laser cutting, welding, securement and machining technologies which are well known to those of ordinary skill in the art. One of ordinary skill will appreciate that the mount 11 the Armrest for Removable Door Vehicles 10 could be constructed by any method known to those in the art including via casting, forging and machining or stamping and punching, without restriction or limitation. One of ordinary skill will also appreciate that the Armrest for Removable Door Vehicles 10 disclosed herein is designed, fabricated and configured to work with any type of vehicle 1 having a door striker plate 3 mount on the interior of the door frame 2 as shown in FIGS. 2-5 and may be engaged as shown and illustrated herein but is in no way limited to working only with a particular vehicle 1.

Figure 1:
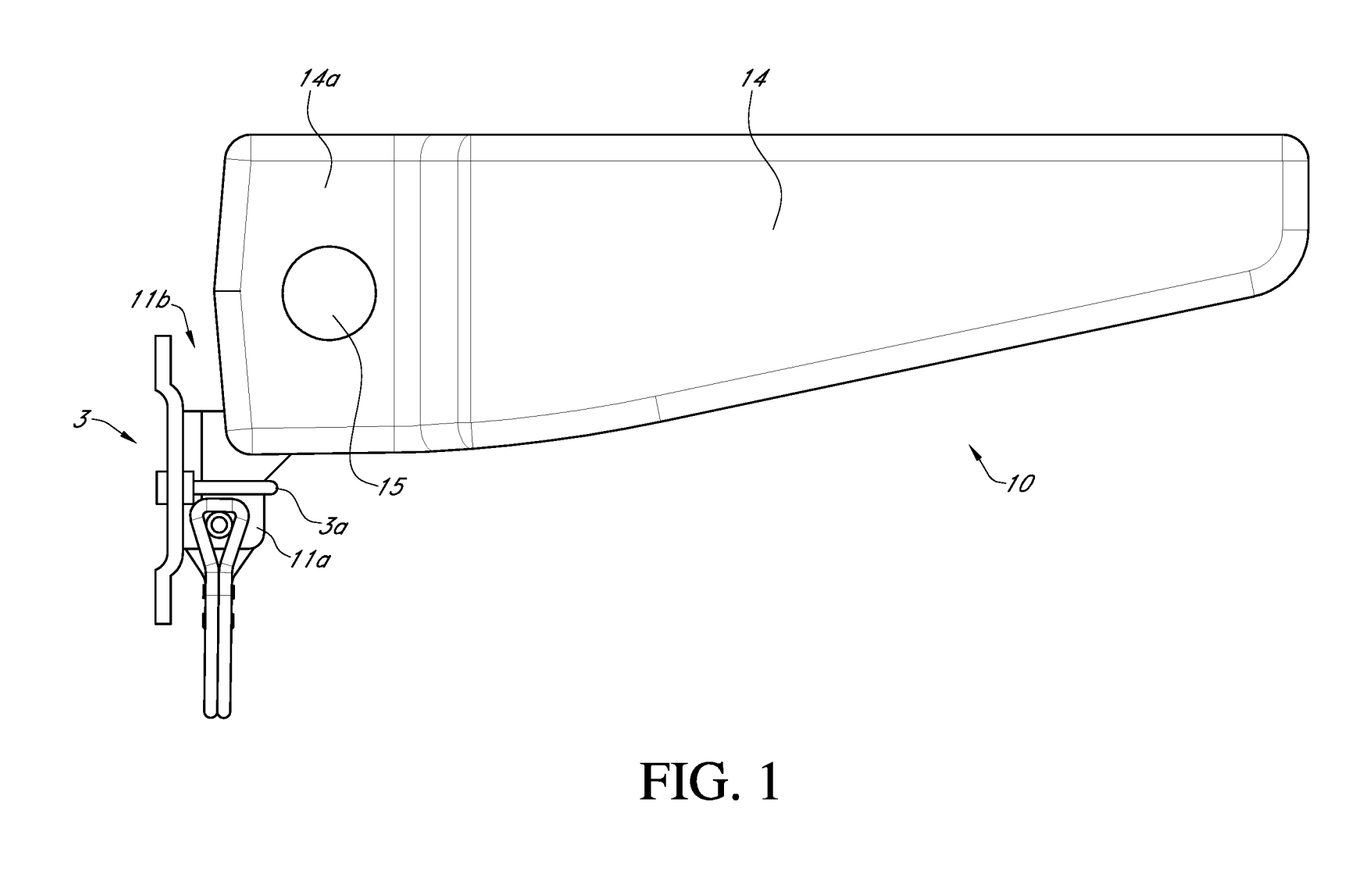
FIG. 1 is a detailed side view of the Armrest for Removable Door Vehicles as disclosed herein.
Figure 1A:
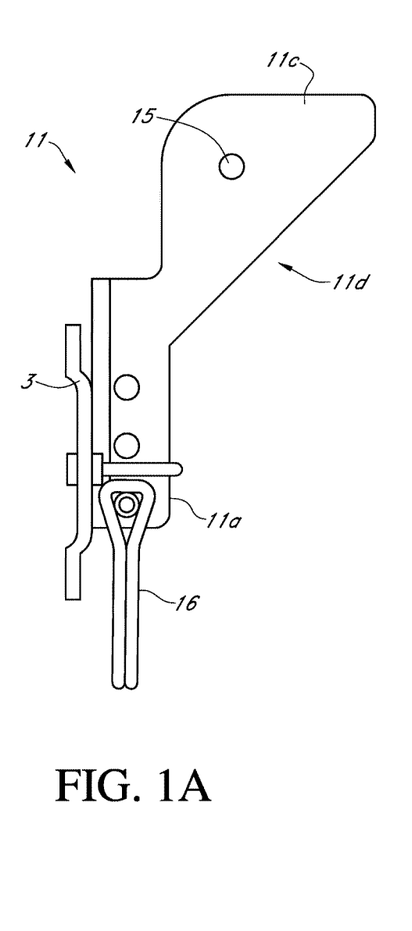
FIG. 1A is a right side view of the mount as disclosed in FIG. 1.
Figure 1B:
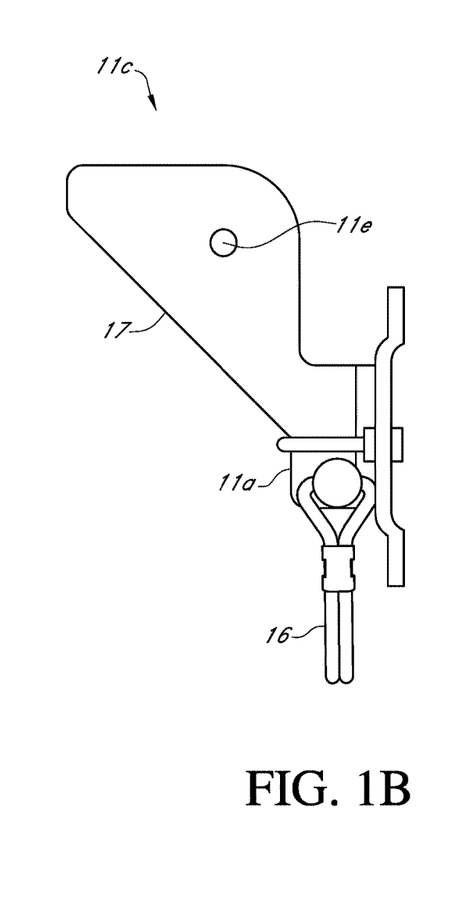
FIG. 1B is a left side view of the mount as disclosed in FIG. 1.
Figure 2:
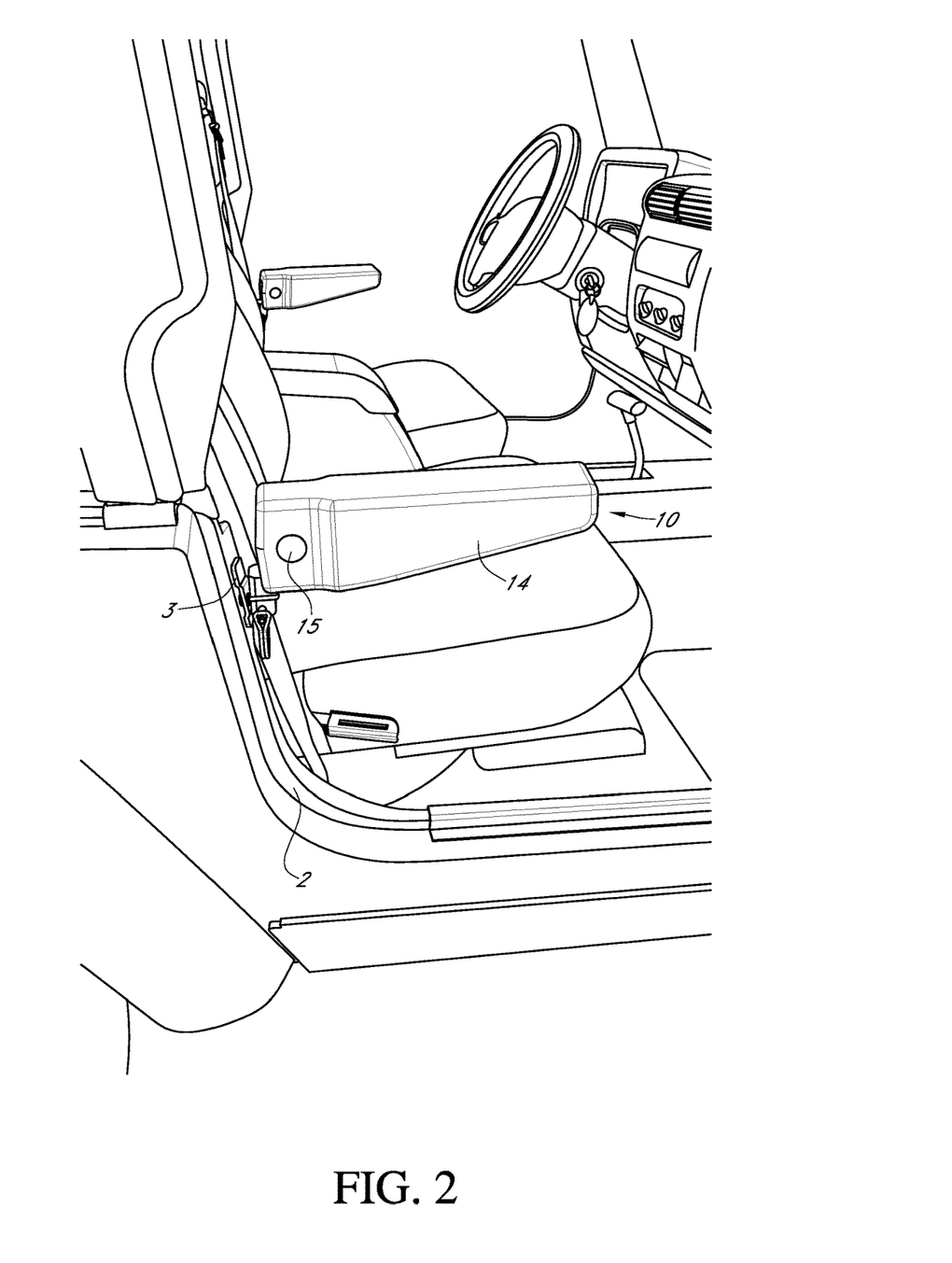
FIG. 2 is a side perspective view of a pair of Armrests for Removable Door Vehicles as disclosed throughout mounted in vehicle.
Figure 3:
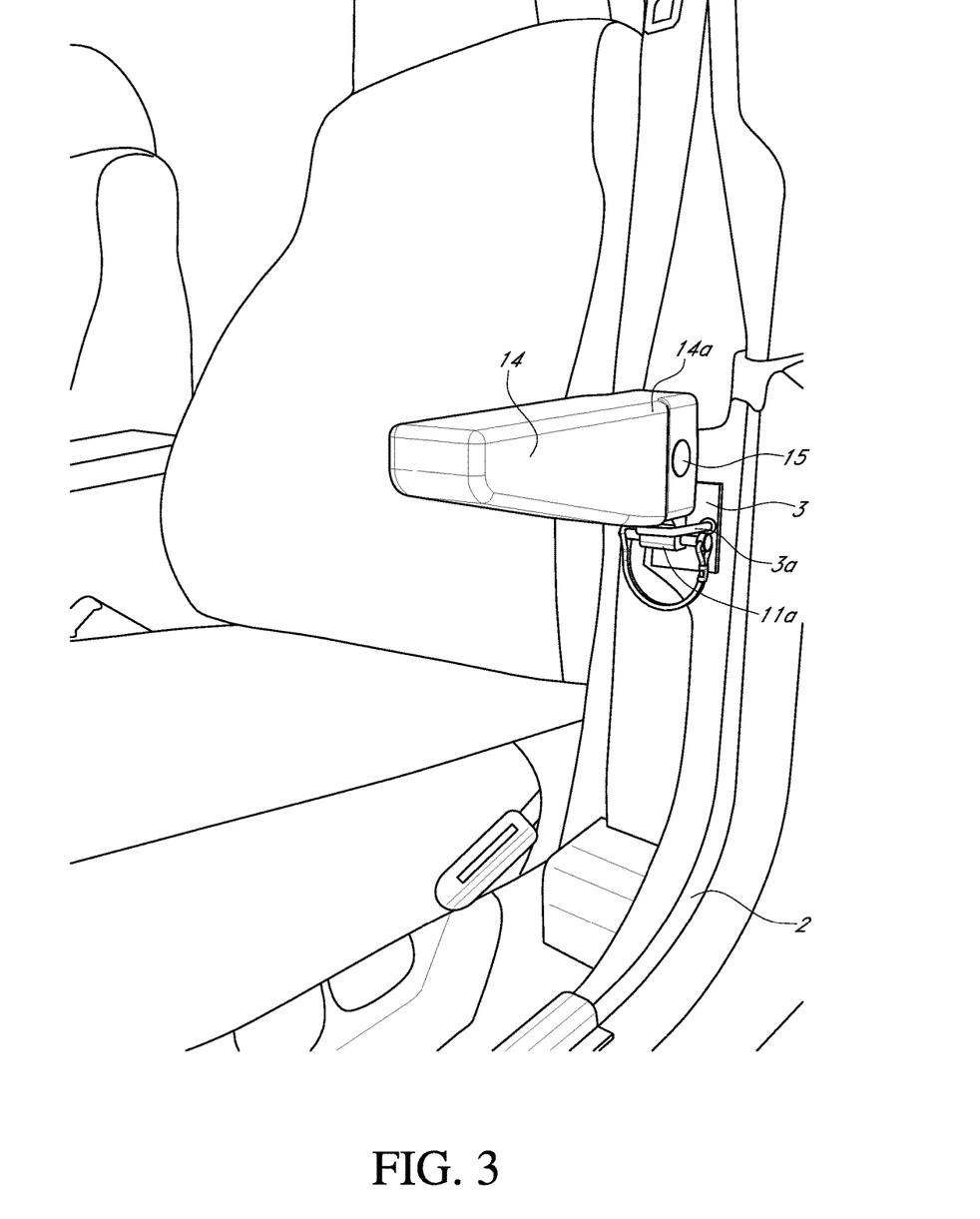
FIG. 3 is a front perspective view of the Armrest for Removable Door Vehicles as disclosed throughout herein in a first position for use during operation of the vehicle.
Figure 4:
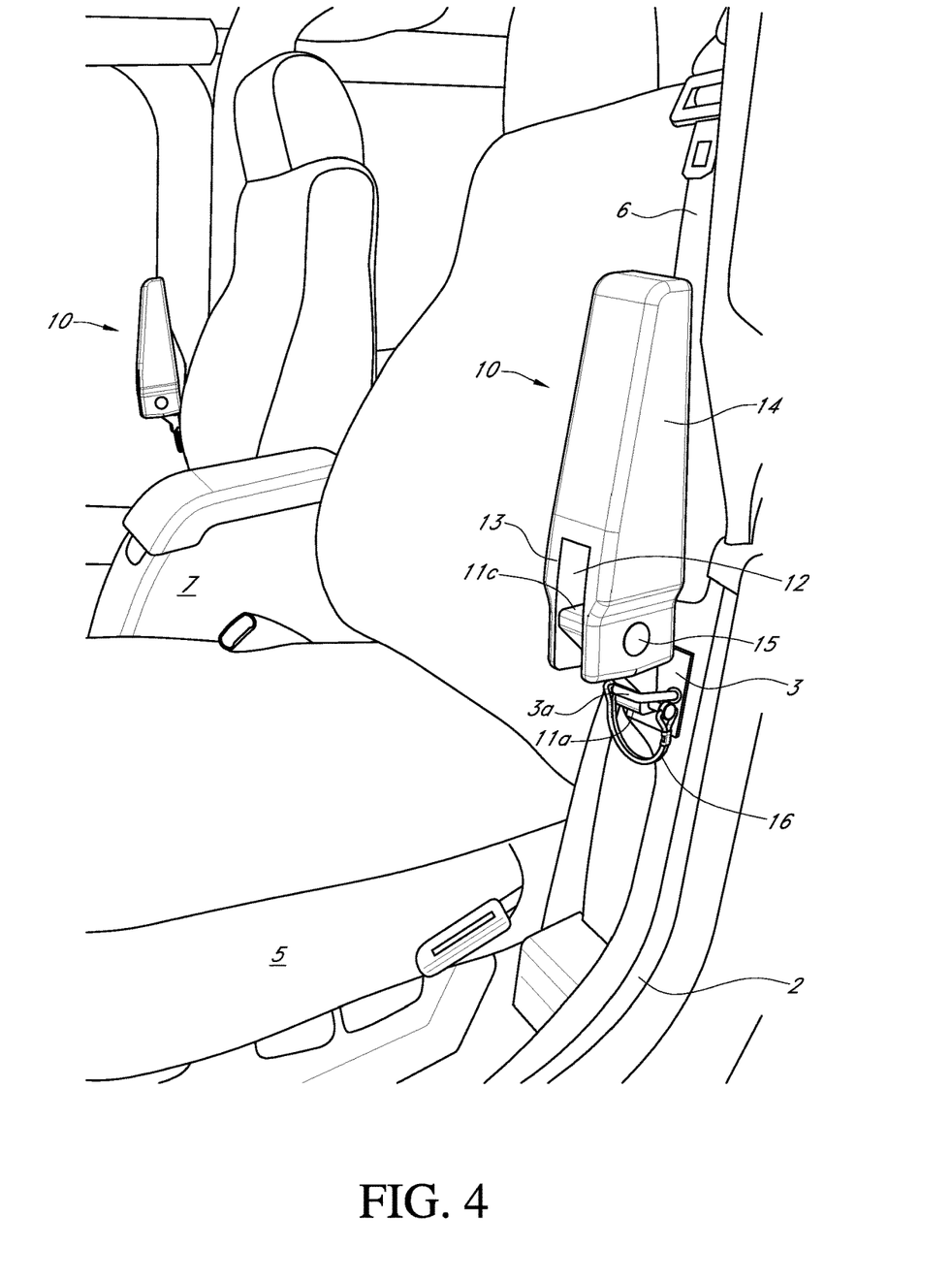
FIG. 4 is a front perspective view of the Armrest for Removable Door Vehicles as disclosed throughout herein rotated to a second position for allowing the user to easily exit or enter the vehicle for vehicle operation.

FIG. 1 is a detailed side view of the Armrest for Removable Door Vehicles 10 as disclosed herein. Typically, the door striker plate 3 of a vehicle is relatively standard in size with the door striker plate crossbar 3a configured to work with the latching mechanism of the vehicle door. (See FIG. 6.) The objective of this disclosure is to use the door striker plate 3 and door striker plate crossbar 3a as the holder for the armrest and mount 11 disclosed herein so that when the vehicle doors are removed, the vehicle operator has a place to rest their arms during operation of the vehicle (See FIGS. 2-4 as used). As shown, the armrest for removable door vehicles 10 is configured of a pad 14, a mount 11 and a notch 11i. The pad 14 is configured for use as an armrest and the mount 11 is configured for insertion and engagement with a door striker plate 3 of a vehicle. The pad 14 is configured with a housing 12 which allows the pad 14 to engage with the mount 11 (as shown in FIG. 4). As shown, the pad 14 is configured with a first end, a second end, a first side and a second side wherein the first end of the first side of the pad 14 is configured with a slot 13 which allows the pad 14 to engage and function as an armrest for removable door vehicles 10. The second end and the second side of the pad 14 are configured for use as a padded armrest for the operator. One of ordinary skill will appreciate that the pad 14 is removable which allows the user or the operator to change the armrest with ease when needed. The mount 11 is generally configured as an "L" shape having two legs. (See FIGS. 1, 1A and 1B) The mount 11 is comprised of an upper leg 11c and a lower leg 11a wherein the lower leg 11a is configured for insertion and engagement with the door striker plate 3 and the upper leg 11c of the mount is configured for engagement with the housing 12 of the pad via a removable pin 16. The lower leg 11a is sized to fit within and rest between the door striker plate 3 and the door striker plate crossbar 3a. Typical dimensions for the lower leg 11a are in the range of 1-3 inches, without any restriction and/or limitation unless otherwise indicated in the following claims. The notch 11i is positioned between the upper leg 11c of the mount 11 and the lower leg 11a of the mount 11 and is adapted for engagement with the door striker plate 3. The size of the notch may be configured for engagement with the diameter of the door strike cross bar which allows the Armrest for Removable Door Vehicles 10 to be more securing and stable when the vehicle is in motion. The notch may be further configured as an enclosed notch depending on the particular application, without any limitation and/or restriction unless otherwise indicated in the following claims. As shown, the upper exterior of the mount 11 is carved out to create a recess 11b. The recess 11b provides space for the end portion 14a of the padded armrest 14 to pass through during rotation of the armrest from the operation position (generally horizontal) as shown at FIGS. 1-3 compared to the exit/entrance position (generally vertical) as shown at FIG. 4. FIG. 1A is a right side view of the mount 11 as disclosed in FIG. 1 with the angled portion 11d called out as 11d. FIG. 1B is a left side view of the mount 11 as disclosed in FIG. 1 with the lower leg 11a and the angled portion 11d called out. A set screw aperture 11g not shown) is positioned in face of the angled portion 11d and allows insertion of a setscrew 17 (not shown) to lock the position of the pin 15. (see additional discussion infra)

As shown in FIG. 1a, the lower leg 11a may have multiple locking apertures 11f positioned therein allowing for lower legs 11a having either multiple lengths or multiple positions of mount 11 for either height adjustment of the armrest or use with various vehicle configurations. Locking pin 16 fixes the position of mount 11 in relation to the vehicle 1, vehicle door frame 2 and striker plate 3. In this way, removal of the locking pin 16 allows for removal of the armrest 10 and re-attachment of the removable vehicle doors very easily and conveniently.

One of ordinary skill will appreciate that other means and types of fasteners may be used without departure from the spirit and intent of the disclosure herein and could include nuts, bolts, pegs and or filaments or combinations therein. As shown, the upper leg 11c of the mount engages with and fits into housing 12 positioned in the end of the pad 14 configured with slot 13. The housing/pin aperture 11e of mount 11 is proximate the end of upper leg 11c. As shown, pin 15 is positioned within housing/pin aperture 11e to fit into and run through housing 12 (affixed to pad 14) and mount 11 positioned within slot 13. A set screw 17 is positioned in slot 13 for engagement with pin 15 to lock pin 15 into mount 11. Pin 15 is sized to just fit in the housing 12 and allows the armrest pad 14 to rotate between positions. One of ordinary skill will appreciate that other means and types of fasteners may be used to lock down the mount 11 with the padded armrest 14 and housing 12 without departure from the spirit and intent of the disclosure herein.

FIG. 2 is a side perspective view of a pair of Armrests for Removable Door Vehicles as disclosed throughout mounted in vehicle 1. FIG. 3 is a front perspective view of the Armrest for Removable Door Vehicles 10 as disclosed throughout in a first position for use during operation of the vehicle 1. FIG. 4 is a front perspective view of the Armrest for Removable Door Vehicles 10 as disclosed throughout with the armrest pad 14 rotated to a second position allowing the user (not shown) to easily exit or enter the vehicle for vehicle operation. One of ordinary skill will appreciate that recess 11b is of sufficient size and shape to accommodate the end portion of pad 14a, subject to the particular application, to allow the pad 14 of the armrest 10 to move between a generally horizontal position when in use to a generally vertical position to allow the user to move past the armrest 10 for entry or exit of the vehicle 1. Compare FIG. 2 illustrating the armrest pad 14 in the horizontal position for use to FIG. 4 illustrating the armrest pad 14 in the vertical position for vehicle entry or exit.

Figure 5A:
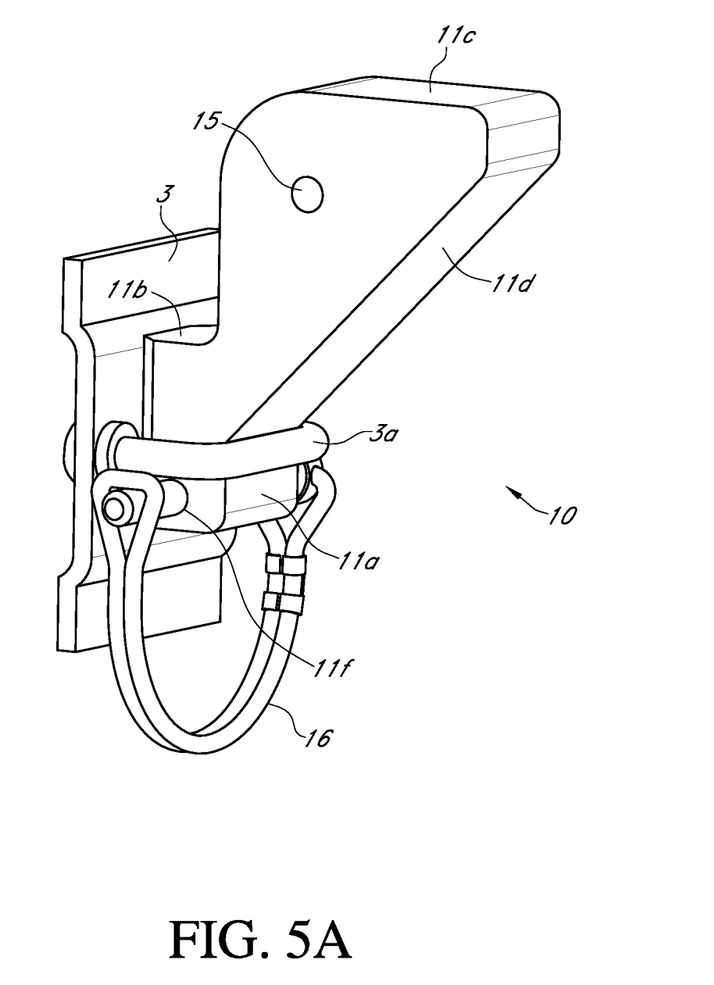
FIG. 5A is a profile view of one embodiment of a mount for use with an Armrest for Removable Door Vehicles as disclosed throughout herein having an angled portion between the upper leg and the lower leg for engagement with the door striker mounting plate crossbar.
Figure 5B:
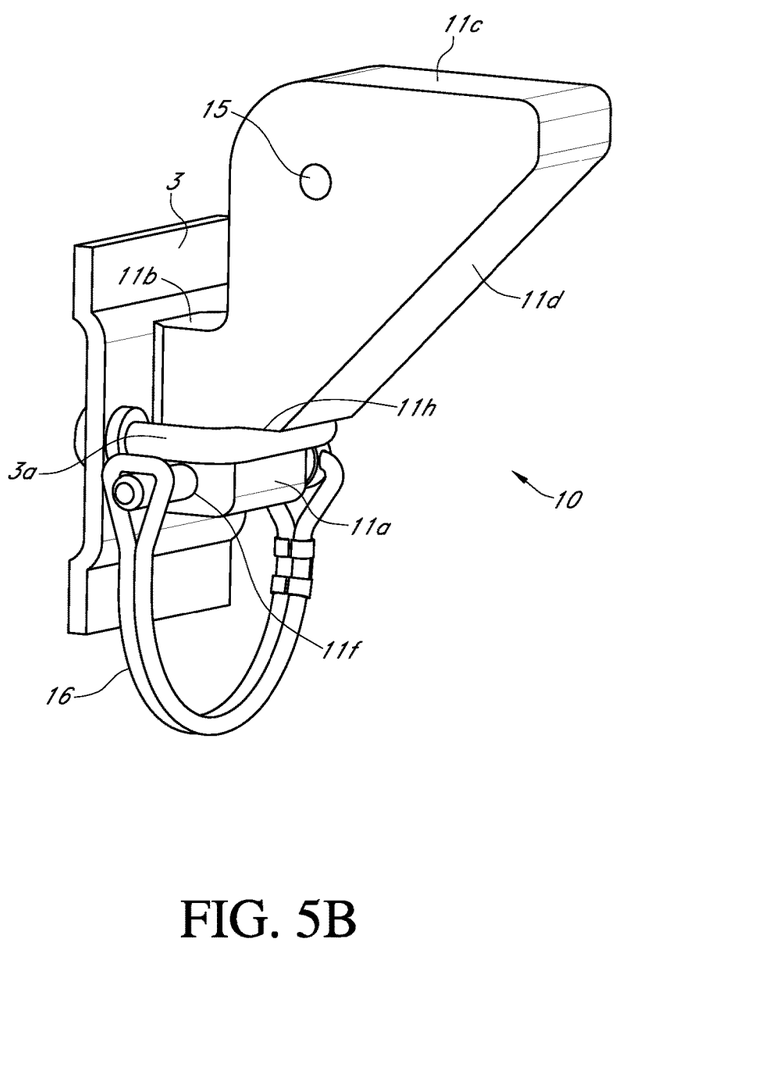
FIG. 5B is a profile view of another embodiment of a mount for use with an Armrest for Removable Door Vehicles as disclosed throughout herein having a ledge portion for engagement with the door striker mounting plate crossbar, wherein the ledge portion is positioned at the transition between the lower leg and the angled portion.

Another aspect of the embodiment is shown in FIG. 5A-5D. FIG. 5A is a profile view of another version of the Armrest for Removable Door Vehicles 10 as disclosed throughout herein having a taper for mounting to the vehicle 1. FIG. 5B is a profile view of a ledge 11h of the Armrest for Removable Door Vehicles 10 as disclosed throughout herein connected to the taper as described in FIG. 5A. The ledge 11h has a dimension between 0.25-0.75 inches, which is slightly greater than the dimension of the diameter of the door striker plate crossbar 3a, without any restriction. One of ordinary skill will appreciate that various types of the mount 11 allows the mount engagement and fit with the door striker plate 3 and door striker plate crossbar 3a. and fit with the pad armrest 14 of the vehicle. Subject to a particular application, the mount 11 for the armrest for removable door vehicle could be configured with the taper (FIGS. 1A, 1B, 5A), ledge 11h (FIG. 5B), notch 11i (FIG. 5C) or enclosed notch 11j (FIG. 5D) which allow for secure engagement between the mount 11 and door striker plate crossbar 3a for use of the armrest for removable door vehicles 10. Similar to the ledge 11h, the notch 11i or the enclosed notch has a dimension between 0.25-0.75 inches, which is slightly greater than the dimension of the diameter of the door striker plate crossbar 3a, without any restriction, to allow engagement with the door strike plate crossbar 3a.

Figure 5C:
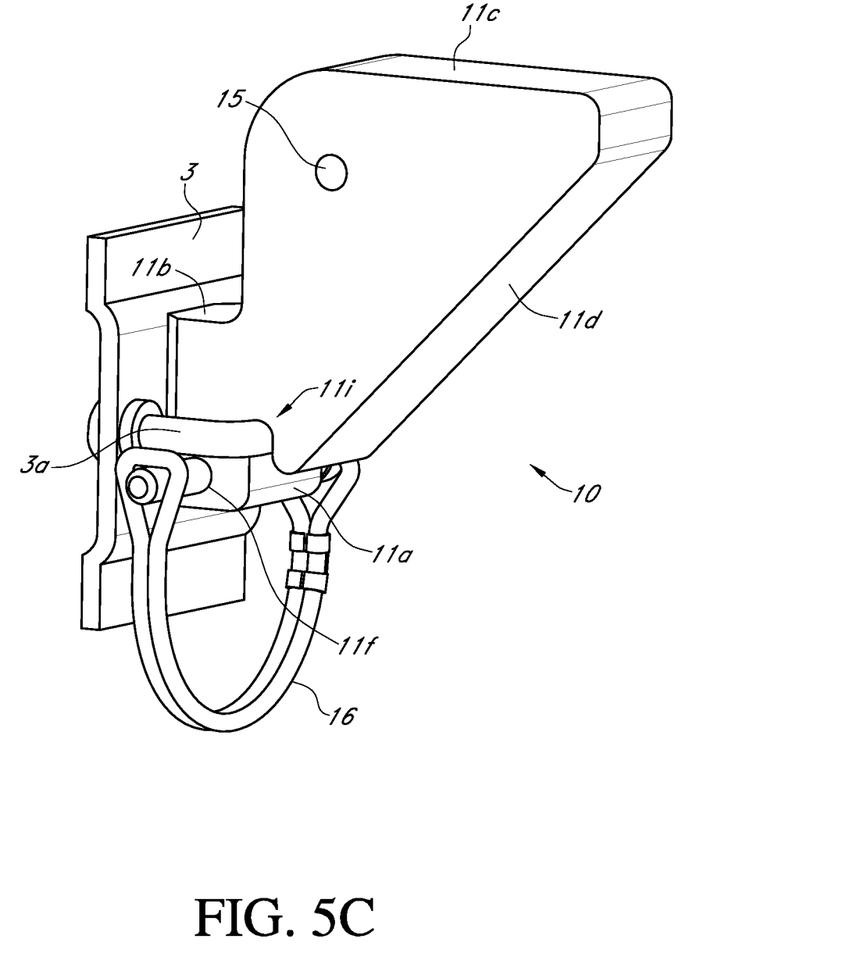
FIG. 5C is a perspective view of another embodiment of the mount for the Armrest for Removable Door Vehicles as disclosed throughout herein having a notch for engagement with the door striker mounting plate crossbar, wherein the notch is positioned at the transition between the lower leg and the angled portion.
Figure 5D:
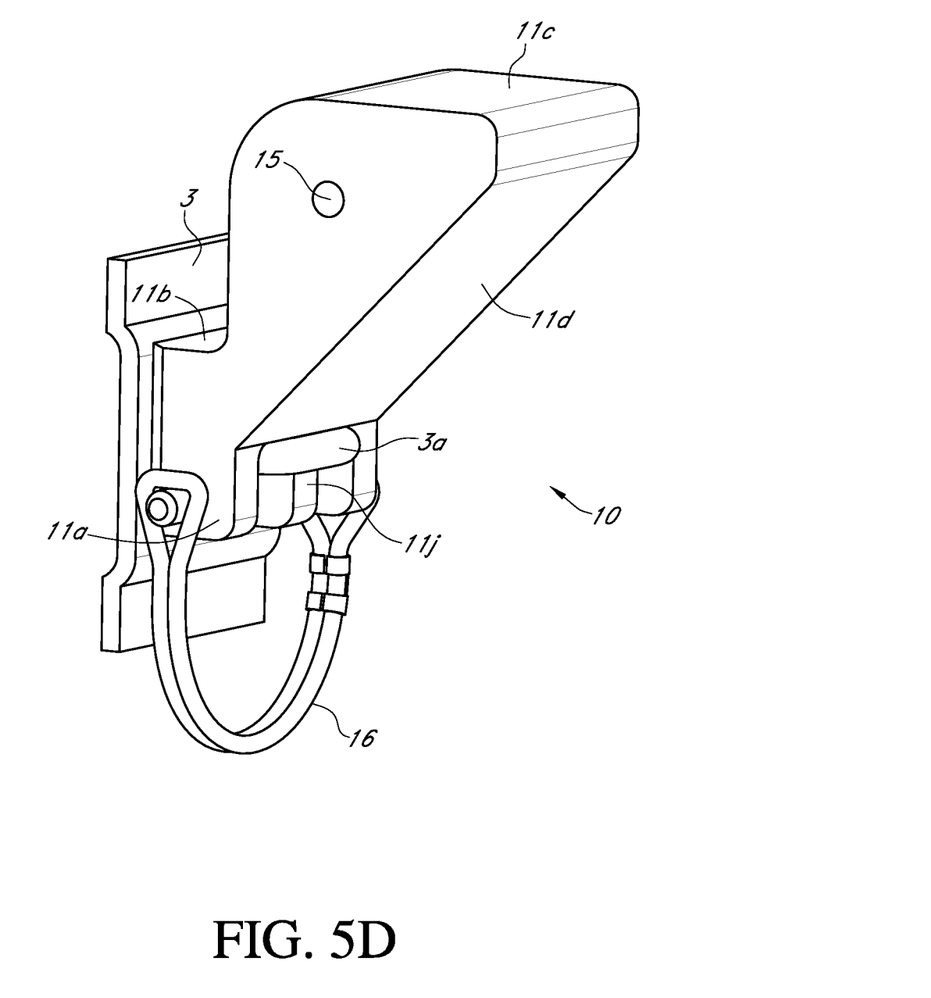
FIG. 5D is a perspective view of another embodiment of the mount for the Armrest for Removable Door Vehicles as disclosed throughout herein having an enclosed notch for engagement with the door striker mounting plate crossbar, wherein the enclosed notch is positioned at the transition between the lower leg and the angled portion.

FIG. 5C is a perspective view of another embodiment of the mount 11 for the Armrest for Removable Door Vehicles 10 as disclosed throughout herein having a notch 11i for engagement with the door striker mounting plate crossbar 3a, wherein the notch 11i is positioned at the transition between the lower leg 11a and the angled portion 11d. The notch 11i is configured to allow engagement between the lower leg 11a of the mount 11 with the door striker plate crossbar 3a, the mount 11 then secured by locking pin 16 into the door striker plate 3 ensuring the armrest 10 is fixed in relation to the vehicle 1, similar to and as illustrated in FIGS. 2-4. FIG. 5D is a perspective view of another embodiment of the mount 11 for the Armrest for Removable Door Vehicles 10 as disclosed throughout herein having an enclosed notch 11j for engagement with the door striker mounting plate crossbar 3a, wherein the enclosed notch 11j is also positioned at the transition between the lower leg 11a and the angled portion 11d.

One of ordinary skill will appreciate that dependent on a particular application and the type of vehicle 1, having a notch 11i or enclosed notch 11j allows the user to remove and install the armrest for removable door vehicles 10 quickly and easily, without any limitation and restriction.

Figure 6:
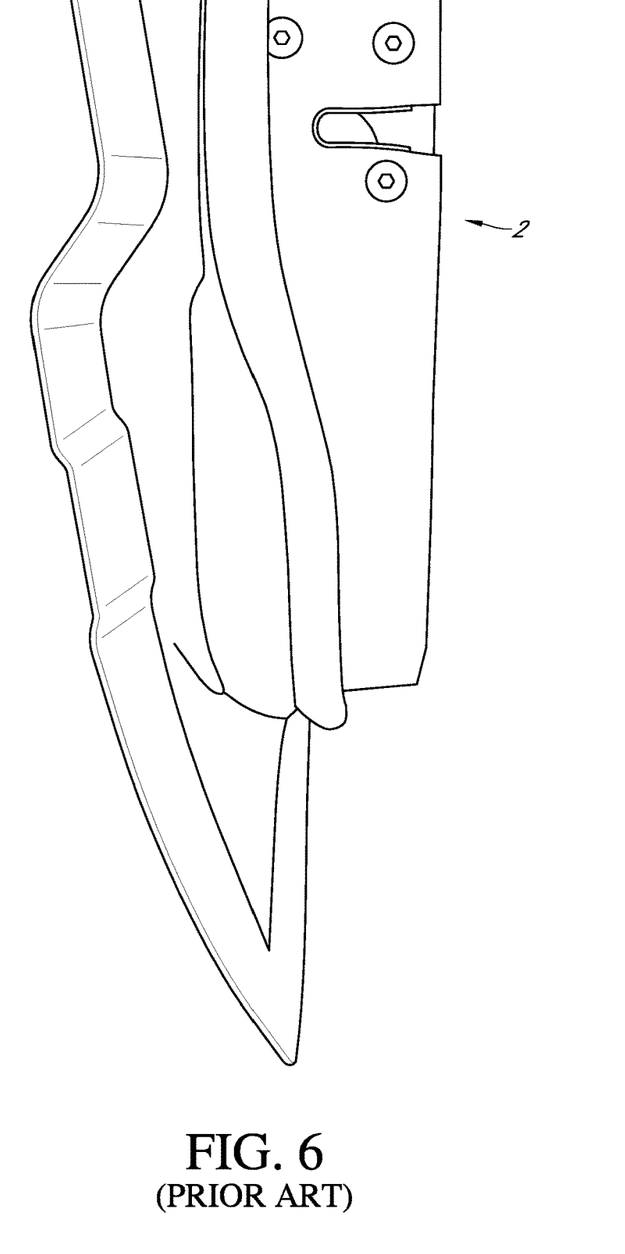
FIG. 6 is a front view of the interior side of a typical vehicle door, particularly the latching mechanism as shown in the upper portion of the figure and in relation to the vehicle door frame.

One of ordinary skill will appreciate that although not shown throughout, any embodiment of the mount 11 having a lower leg 11a and a notch 11i (FIG. 5C) or enclosed notch 11j (FIG. 5D), may be configured with multiple locking pin apertures 11f to provide for secure engagement between the mount 11 and door striker plate crossbar 3a to allow adjustment of the height of the pad 14 of the armrest 10 for improved user comfort during use. See FIG. 1A. FIG. 6 is a front view of the interior side of a typical vehicle door, particularly the latching mechanism as shown in the upper portion of the figure and in relation to the vehicle door frame. One of ordinary skill will appreciate that the Armrest for the Removable Door Vehicles 10 contemplates removal of the door from the door frame. After removal of the door, the door striker plate 3 and door striker plate crossbar 3a, which would normally engage with the latching mechanism of the door, provide a suitable structure for installation of the mount 11 into the door striker plate 3. (See FIG. 6)

Having described the preferred embodiments, other features of the Armrest for Removable Door Vehicles 10 will undoubtedly occur to those versed in the art, as will numerous modifications and alterations in the embodiments as illustrated herein, all of which may be achieved without departing from the spirit and scope of the Armrest for Removable Door Vehicles 10 disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the use and access of Armrest for Removable Door Vehicles. Furthermore, the methods and embodiments pictured and described herein are no way limiting to the scope of the Armrest for Removable Door Vehicles 10 and method of use unless so stated in the following claims.

It should be noted that the Armrest for Removable Door Vehicles 10 is not limited to the specific embodiments pictured and described herein, but is intended to apply to all similar apparatuses and methods for providing the various benefits and/or features of a Armrest for Removable Door Vehicles. Modifications and alterations from the described embodiments will occur to those skilled in the art without departure from the spirit and scope of the Armrest for Removable Door Vehicles. It is understood that the Armrest for Removable Door Vehicles 10 as disclosed herein extends to all alternative combinations of one or more of the individual features mentioned, evident from the text and/or drawings, and/or inherently disclosed. All of these different combinations constitute various alternative aspects of the Armrest for Removable Door Vehicles 10 and/or components thereof. The embodiments described herein explain the best modes known for practicing the Armrest for Removable Door Vehicles 10 and/or components thereof and will enable others skilled in the art to utilize the same. The claims are to be construed to include alternative embodiments to the extent permitted by the prior art.

While the Armrest for Removable Door Vehicles 10 has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: Matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

What is claimed is:

1. An armrest for a removable door vehicle comprising:
    a) a pad having a first end, a second end, a first side and second side, wherein the first end of the first side of the pad is configured with a housing, the second end and the second side of the pad configured for use as an armrest;
    b) a mount having a lower leg and an upper leg wherein the lower leg is adapted for insertion and engagement with a door striker plate and a door striker plate crossbar of a vehicle having removable doors, the upper leg configured for engagement with the housing of the pad;
    c) a recess positioned on the lower leg, the recess positioned on the upper side of the lower leg, adjacent the door striker plate; and,
    d) a notch, the notch is positioned between the lower leg of the mount and the upper leg of the mount, the notch adapted to engage with the door striker plate crossbar.

2. The armrest for a removable door vehicle according to claim 1 wherein the mount is generally configured with an "L" shape.

3. The armrest for a removable door vehicle according to claim 1 wherein the mount allows the pad to rotate allowing the user to easily exit or enter the vehicle.

4. The armrest for a removable door vehicle according to claim 1 wherein the mount allows the pad to rotate from a first generally vertical position to a second generally horizontal position.

5. The armrest for a removable door vehicle 10 according to claim 1 wherein the mount is configured with a recess in the upper leg to provide sufficient clearance for the first end of the pad to rotate from a first position to a second position.

6. The armrest for a removable door vehicle according to claim 1 wherein the mount is configured with the recess to allow the pad to rotate from a first generally vertical position to a second generally horizontal position.

7. The armrest for a removable door vehicle according to claim 1 wherein an aperture is positioned in the lower leg to allow insertion and engagement with a locking pin for securement of the mount within the door striker plate and the door striker plate crossbar.

8. The armrest for a removable door vehicle according to claim 1 wherein the mount is configured with an angled portion between the lower leg of the mount and the upper leg.

9. The armrest for a removable door vehicle according to claim 1 wherein a plurality of apertures may be positioned in the lower leg of the mount for vertical height adjustment of the armrest.

10. The armrest for a removable door vehicle according to claim 1 wherein the pad is replaceable.

11. The armrest for a removable door vehicle according to claim 1 wherein the housing is detachable from the upper leg of the mount via a removable pin.

12. The armrest for a removable door vehicle according to claim 1 wherein the notch is configured to allow the door striker plate crossbar to rest within the notch.

13. The armrest for a removable door vehicle according to claim 12 wherein the notch is positioned in the upper leg proximate the lower leg.

14. The armrest for a removable door vehicle according to claim 1 wherein the notch is positioned in the upper leg and configured to allow the door striker plate crossbar to rest within the notch.

15. The armrest for a removable door vehicle according to claim 1 wherein the notch is configured to allow the door striker plate crossbar to rest within the notch and the notch is positioned in the angled portion.

16. The armrest for a removable door vehicle according to claim 1 wherein the notch is configured as an enclosed notch.

17. The armrest for a removable door vehicle according to claim 16 wherein the enclosed notch is positioned in an angled portion, the enclosed notch adapted to engage with the door striker plate crossbar.

18. The armrest for a removable door vehicle according to claim 16 wherein the enclosed notch is positioned between the lower leg and the upper leg, the enclosed notch adapted to engage with the door striker plate crossbar.

* * * * *